(12) United States Patent
Watanabe et al.

(10) Patent No.: US 9,684,024 B2
(45) Date of Patent: Jun. 20, 2017

(54) METHOD FOR DETERMINING UNMATED CONNECTOR AND PROGRAM

(71) Applicant: YAZAKI CORPORATION, Tokyo (JP)

(72) Inventors: Jin Watanabe, Aichi (JP); Shinya Mori, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 144 days.

(21) Appl. No.: 14/707,747

(22) Filed: May 8, 2015

(65) Prior Publication Data

US 2015/0241499 A1 Aug. 27, 2015

Related U.S. Application Data

(63) Continuation of application No. PCT/JP2013/080824, filed on Nov. 14, 2013.

(30) Foreign Application Priority Data

Nov. 14, 2012 (JP) .................................. 2012-250532

(51) Int. Cl.
*G01R 31/02* (2006.01)
*G06F 17/50* (2006.01)
*G01R 31/00* (2006.01)

(52) U.S. Cl.
CPC ......... *G01R 31/023* (2013.01); *G01R 31/005* (2013.01); *G06F 17/5045* (2013.01); *G06F 2217/02* (2013.01); *G06F 2217/36* (2013.01)

(58) Field of Classification Search
CPC combination set(s) only.
See application file for complete search history.

(56) References Cited

U.S. PATENT DOCUMENTS 3,582,865 A * 6/1971 Franck ................ H05K 7/1007
361/702
7,342,325 B2 3/2008 Rhodes
(Continued)

FOREIGN PATENT DOCUMENTS

CN 101930630 A * 12/2010
CN 102754101 A 10/2012
(Continued)

OTHER PUBLICATIONS

International Preliminary Report on Patentability and English language Written Opinion of the International Search Report for PCT/JP2013/080824 dated May 19, 2015.
(Continued)

*Primary Examiner* — Vincent Q Nguyen
(74) *Attorney, Agent, or Firm* — Kenealy Vaidya LLP

(57) ABSTRACT

A group of electric wires of a first wire harness assigned to a first divided region is identified for each pattern as a necessary electric wire having a connection counterpart in a second divided region adjacent to the first divided region among the divided regions and an extra electric wire not having a connection counterpart in the second divided region. It is determined, out of connectors connected to a group of the electric wires of the first wire harness, that a connector is an unmated connector when all electric wires connected to the connector are the extra electric wires.

8 Claims, 10 Drawing Sheets

(56) References Cited

U.S. PATENT DOCUMENTS

| 9,272,674 | B2 | 3/2016 | Sasaki et al. |
| 2004/0061446 | A1 | 4/2004 | Rhodes |
| 2004/0183375 | A1 | 9/2004 | Hayes |
| 2012/0262185 | A1 | 10/2012 | Sasaki et al. |
| 2013/0009649 | A1 | 1/2013 | Sasaki et al. |
| 2013/0024140 | A1 | 1/2013 | Kouno et al. |

FOREIGN PATENT DOCUMENTS

| CN | 102763106 A | 10/2012 |
| JP | 2008-300246 A | 12/2008 |
| JP | 2011-137800 A | 7/2011 |
| JP | 2011-180115 A | 9/2011 |
| WO | 2005/036706 A2 | 4/2005 |

OTHER PUBLICATIONS

Japanese Office Action for the related Japanese Patent Application No. 2012-250532 dated Apr. 27, 2016.
International Search Report and Written Opinion of the International Search Report for PCT/JP2013/080824 dated Dec. 10, 2013.
Chinese Office Action for the related Chinese Patent Application No. 201380059641.8 dated Apr. 12, 2017.

* cited by examiner

FIG.2
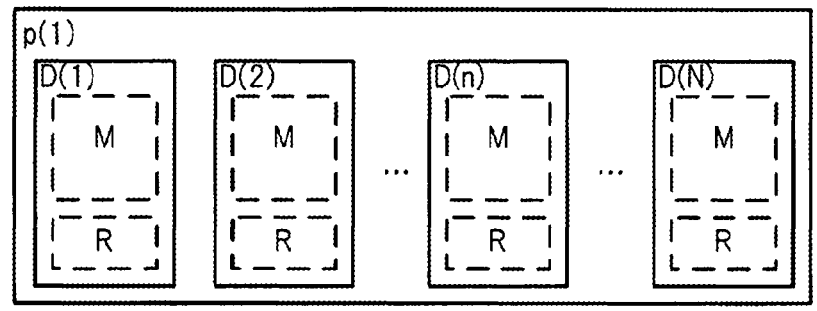
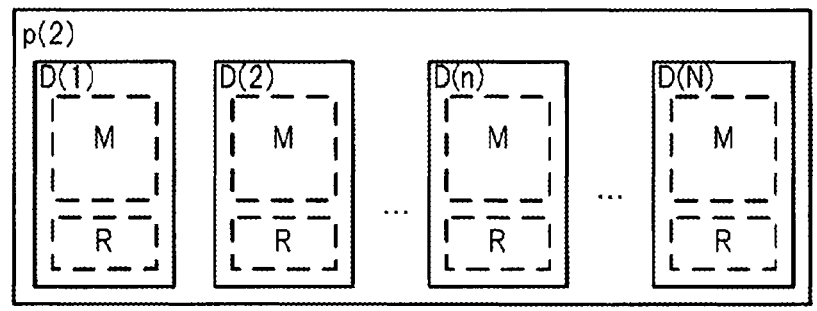
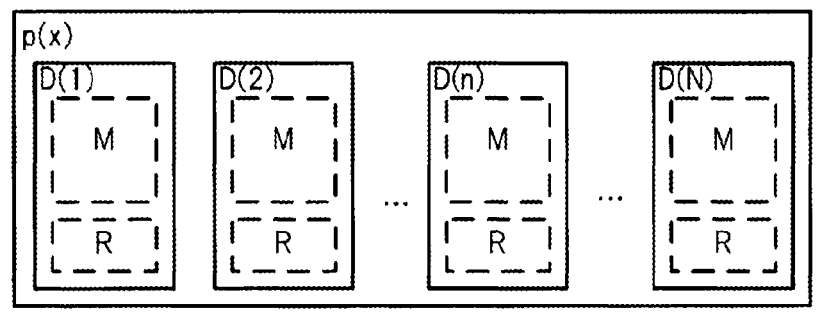
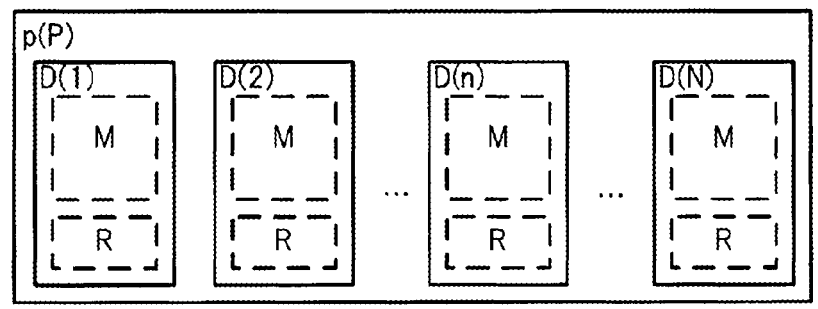

FIG.4

| DRAWING NUMBER | F CONNECTOR NAME | CONNECTOR PART NUMBER | TERMINAL | C/N | T CONNECTOR NAME | CONNECTOR PART NUMBER | TERMINAL | C/N | INSPECTION RESULT |
|---|---|---|---|---|---|---|---|---|---|
| ENGINE-A01 | W TO W 1 | AAA | M01 | 12 | W TO W 2 | XXX | S01 | 4 | ○ |
| ENGINE-A01 | J/B1 | JJJ | J09 | 3 | LAMP1 | LLL | L01 | 12 | ○ |
| ENGINE-A01 | R/B1 | RRR | R08 | 5 | W TO W 2 | XXX | S01 | 8 | ○ |
| ENGINE-A01 | W TO W 1 | AAA | M02 | 11 | W TO W 2 | YYY | Z02 | 6 | |
| ENGINE-A01 | W TO W 1 | BBB | M03 | 3 | R/B3 | RRR | R04 | 3 | ○ |
| ENGINE-A01 | R/B2 | RRR | R09 | 3 | J/B3 | JJJ | J08 | 9 | ○ |
| ENGINE-A01 | ECU1 | EEE | E03 | 6 | W/S1 | WWW | T05 | 10 | ○ |
| ENGINE-A01 | SENSOR1 | SSS | O05 | 9 | R/B3 | RRR | R04 | 5 | ○ |
| ENGINE-A01 | W/S1 | WWW | K04 | 4 | W TO W 2 | XXX | S01 | 2 | ○ |
| ENGINE-A01 | ECU2 | EEE | E06 | 5 | W TO W 2 | XXX | S02 | 9 | ○ |
| ENGINE-A01 | ECU3 | EEE | E05 | 8 | J/B3 | JJJ | Y03 | 6 | ○ |
| ENGINE-A01 | W TO W 1 | AAA | M05 | 1 | W TO W 2 | YYY | Z02 | 5 | |
| ENGINE-A01 | ECU4 | EEE | E07 | 1 | W TO W 2 | YYY | Z01 | 4 | |
| ENGINE-A01 | W TO W 1 | BBB | M02 | 3 | R/B4 | BBB | R02 | 8 | ○ |
| ENGINE-A01 | ECU2 | ECU | E09 | 9 | W TO W 2 | XXX | S01 | 7 | |
| ENGINE-A01 | SENSOR1 | EEE | O09 | 3 | W/S1 | WWW | T05 | 9 | |
| ENGINE-A01 | SENSOR2 | SSS | O08 | 8 | J/B3 | JJJ | Y05 | 11 | ○ |
| ENGINE-A01 | W TO W 1 | BBB | M05 | 7 | ECU5 | EEE | L07 | 3 | ○ |

FIG.5

| DRAWING NUMBER | F CONNECTOR NAME | CONNECTOR PART NUMBER | TERMINAL | C/N | T CONNECTOR NAME | CONNECTOR PART NUMBER | TERMINAL | C/N | INSPECTION RESULT |
|---|---|---|---|---|---|---|---|---|---|
| ENGINE-A01 | W TO W 1 | AAA | M01 | 12 | W TO W 2 | XXX | S01 | 4 | ○ |
| ENGINE-A01 | R/B1 | RRR | R08 | 5 | W TO W 2 | XXX | S01 | 8 | ○ |
| ENGINE-A01 | W TO W 1 | AAA | M02 | 11 | W TO W 2 | YYY | Z02 | 6 | |
| ENGINE-A01 | W/S1 | WWW | K04 | 4 | W TO W 2 | XXX | S01 | 2 | ○ |
| ENGINE-A01 | ECU2 | EEE | E06 | 5 | W TO W 2 | XXX | S02 | 9 | ○ |
| ENGINE-A01 | W TO W 1 | AAA | M05 | 1 | W TO W 2 | YYY | Z02 | 5 | |
| ENGINE-A01 | ECU4 | EEE | E07 | 1 | W TO W 2 | YYY | Z01 | 4 | |
| ENGINE-A01 | ECU2 | ECU | E09 | 9 | W TO W 2 | XXX | S01 | 7 | |

FIG.6

| DRAWING NUMBER | F CONNECTOR NAME | CONNECTOR PART NUMBER | TERMINAL | C/N | CONNECTOR NAME | CONNECTOR PART NUMBER | TERMINAL | C/N | INSPECTION RESULT |
|---|---|---|---|---|---|---|---|---|---|
| ENGINE-A01 | W TO W 1 | AAA | M01 | 12 | W TO W 2 | XXX | S01 | 4 | ○ |
| ENGINE-A01 | R/B1 | RRR | R08 | 5 | W TO W 2 | XXX | S01 | 8 | ○ |
| ENGINE-A01 | W/S1 | WWW | K04 | 4 | W TO W 2 | XXX | S01 | 2 | ○ |
| ENGINE-A01 | ECU2 | EEE | E06 | 5 | W TO W 2 | XXX | S02 | 9 | ○ |
| ENGINE-A01 | ECU2 | ECU | E09 | 9 | W TO W 2 | XXX | S01 | 7 | |
| ENGINE-A01 | W TO W 1 | AAA | M02 | 11 | W TO W 2 | YYY | Z02 | 6 | |
| ENGINE-A01 | W TO W 1 | AAA | M05 | 1 | W TO W 2 | YYY | Z02 | 5 | |
| ENGINE-A01 | ECU4 | EEE | E07 | 1 | W TO W 2 | YYY | Z01 | 4 | |

CONNECTOR 1 (columns: CONNECTOR NAME, CONNECTOR PART NUMBER, TERMINAL, C/N, INSPECTION RESULT for first 5 rows)

CONNECTOR 2 (columns: CONNECTOR NAME, CONNECTOR PART NUMBER, TERMINAL, C/N for last 3 rows)

FIG.7A
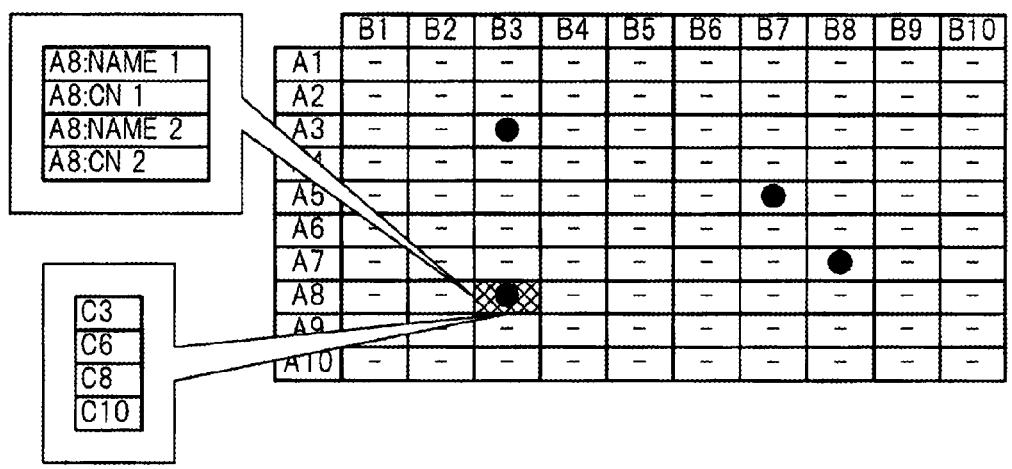
FIG.7B
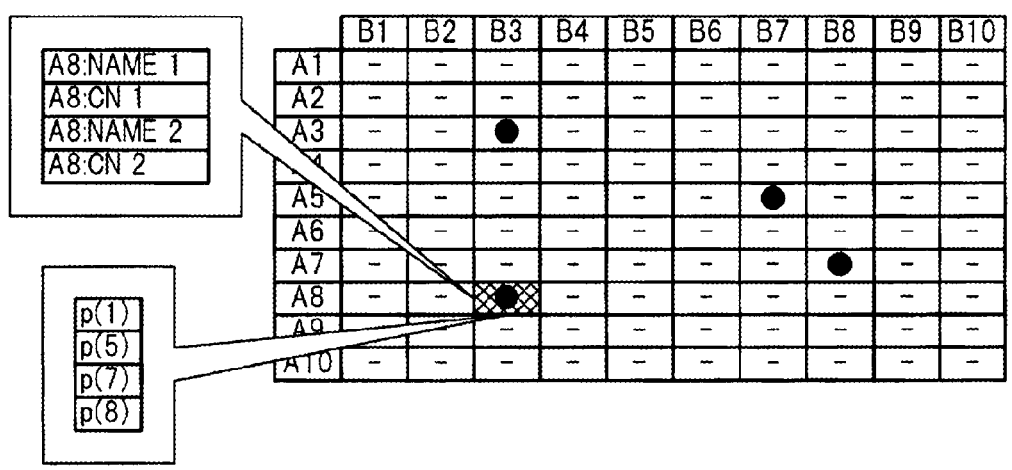
FIG.7C

METHOD FOR DETERMINING UNMATED CONNECTOR AND PROGRAM

CROSS REFERENCE TO RELATED APPLICATIONS

This application is a continuation of international patent application No. PCT/JP2013/080824 filed on Nov. 14, 2013 based on Japanese Patent Application No. 2012-250532 filed on Nov. 14, 2012, the contents of which are incorporated herein by reference.

BACKGROUND OF THE INVENTION

1. Field of the Invention

The present invention relates to a method for determining the existence and non-existence of a connector with no fitting counterpart, i.e., an unmated connector when a wire harness is routed in a vehicle panel, and a program.

2. Description of the Related Art

JP-A-2011-137800 and JP-A-2011-180115 disclose a wire harness continuity inspection apparatus. The wire harness continuity inspection apparatus simulates a situation in which a wire harness with an arbitrary part number is assigned to each of regions (an engine compartment, a vehicle interior wall, a trunk compartment, and the like, hereinafter, each of the regions being referred to as a divided region) into which the space of a vehicle is divided on a functional basis and in which a wire harness can be routed. In addition, the wire harness continuity inspection apparatus analyzes whether electric components (for example, a battery, an electronic control unit (ECU), and a drive machine) are connected to each other via electric wires of the wire harness routed in each of the divided regions.

The wire harness continuity inspection apparatus disclosed in JP-A-2011-137800 and JP-A-2011-180115 locates a starting point of a circuit line in auxiliary device wiring information. For each circuit line, the wire harness continuity inspection apparatus determines whether the electric wire with the end portion, and the connection of an electric wire connected thereto is connected to an ending point of the circuit line in the auxiliary device wiring information, while tracing the electric wire with the end portion, and the connection of an electric wire connected thereto with reference to the partial connector and wiring information.

The wire harness continuity inspection apparatus disclosed in JP-A-2011-137800 and JP-A-2011-180115 has a plurality of candidates for the wire harness which can be routed in each divided region, that is, a plurality of part numbers of wire harnesses that can be routed in each divided region in the assignment of a routable wire harness to each divided region of a target vehicle, and the preparation of partial connector and wiring information. When the space of a vehicle is divided into three divided regions, and there are two candidates (that is, part numbers) present for the wire harness which can be routed in each of the divided regions, eight (2×2×2) partial connector and wiring patterns are prepared. It is determined whether the starting point and the ending point of an electric wire connecting electric components in the auxiliary device wiring information and the partial connector and wiring information coincide with those in the partial connector and wiring information, respectively.

SUMMARY OF THE INVENTION

When a plurality of part numbers of wire harnesses can be routed in a divided region, a possibly-unused electric wire may exist among the plurality of part numbers of wire harnesses. Here, the cause for having the possibly-unused electric wire and the definition of the possibly-unused electric wire will be described with reference to FIGS. 9A to 9C. FIGS. 9A to 9C are diagrams illustrating states in which wire harnesses with the respective different part numbers are routed in the same vehicle.

As illustrated in FIG. 9A, the space of the vehicle is divided into three divided regions A, B, and C, a wire harness W1 with a part number A1 is routed in the divided region A, a wire harness W2 with a part number B1 is routed in the divided region B, and a wire harness W3 with a part number C1 is routed in the divided region C. In addition, an electric component E11 is installed in the divided region A, an electric component E21 is installed in the divided region B, and electric components E31 and E32 are installed in the divided region C.

Connectors C11 and Cab are respectively provided in end portions of an electric wire of the wire harness W1. The connector C11 is connected to the electric component E11, and the connector Cab is connected to a connector Cab in an end portion of the wire harness W2.

The connector Cab and connectors C21 and Cbc1 are respectively provided in the end portions of an electric wire of the wire harness W2. The connector Cab is connected to the connector Cab in the end portion of the wire harness W1, the connector C21 is connected to the electric component E21, and the connector Cbc1 is connected to a connector Cbc1 in an end portion of the wire harness W3.

The connector Cbc1 and a connector C31 are respectively provided in the end portions of one of two electric wires of the wire harness W3. The connector Cbc1 is connected to a connector Cbc1 in the end portion of the wire harness W2, and the connector C31 is connected to the electric component E31. The connector Cbc1 and a connector C32 are respectively provided in the end portions of the remaining one of the two electric wires of the wire harness W3. The connector Cbc1 is connected to the connector Cbc1 in the end portion of the wire harness W2, and the connector C32 is connected to the electric component E32.

Subsequently, the routing of the wire harnesses will be described with reference to FIGS. 9B and 9C. The space of the vehicle illustrated in FIGS. 9B and 9C is the same as in FIG. 9A. Similarly to FIG. 9A, the space of the vehicle is divided into three divided regions A, B, and C. First, the difference between FIG. 9A, and FIGS. 9B and 9C is that the electric component E32 is not installed in the divided region C illustrated in FIGS. 9B and 9C. When a plurality of grades can be offered, or optional functions can be selected for the same vehicle type, different electric components are installed on the same type of vehicle due to a difference in grade or the existence and non-existence of an optional function. The reason for the difference in the installed electric component between FIG. 9A and FIGS. 9B and 9C is because the vehicle types are the same, but the grades or the selected optional functions of the vehicles are different.

As illustrated in FIG. 9B, when the electric component E32 is not installed in the divided region C, one electric wire of the two electric wires of the wire harness W3 is not required for the electric component E32. At this time, it is possible to realize a circuit configuration for connecting the electric components of the vehicle by preparing a wire harness W3 with a part number C2 which does not include one electric wire connected to the electric component E32, and by routing the wire harness W3 in the divided region C.

However, since the number of combinations of the grades and the optional functions of the same type of vehicle is a very large number, when preparing the entirety of wire harnesses for each divided region, the wire harness being formed of a different configuration of electric wires for each combination and having a different part number, the part numbers of the wire harness proliferate considerably, and thereby costs for managing the part numbers increase. For this reason, typically, a general-purpose wire harness is prepared for each divided region in such a manner so as to include electric wires compatible for the entirety of a given number of combinations, and the general-purpose wire harness is properly used and routed for a designated grade and a selected optional function.

As illustrated in FIG. 9C, the electric component E32 is not installed in the divided region C; however, the wire harness W3 with the part number C1 including one electric wire for the electric component E32 is prepared and routed in the divided region C. In this case, the wire harness W3 has the same part number C1 as the wire harness W3 routed in the divided region C illustrated in FIG. 9A, and is equivalent to the general-purpose wire harness. It is also possible to realize a circuit configuration for connecting the electric components of the vehicle using the general-purpose wire harness.

However, when the general-purpose wire harness is routed in a divided region, as illustrated in FIG. 9C, the case may happen in which the wire harness includes an electric wire, but the electric wire does not have a target connected to one end or the opposite ends of the electric wire (in FIG. 9C, the connector Cbc1 of the wire harness W2 and the electric component E32 are equivalent thereto.). As such, there may exist an electric wire among a group of electric wires of a wire harness, which has a connection counterpart when being routed in a vehicle of a specification, but does not have a connection counterpart in a vehicle of another specification. In this description, this electric wire is defined as a "possibly-unused electric wire". In the broad sense, the possibly-unused electric wire is defined as circuitry that includes a terminal and a connector provided in an end portion of the possibly-unused electric wire, and the circuit of the possibly-unused electric wire.

When there is a possibly-unused electric wire present as described above, the following cases may occur. That is, when wire harnesses are respectively routed in adjacent divided regions of a vehicle panel, and a connector in an end portion of an electric wire of one wire harness is attempted to be connected to a connector in an end portion of an electric wire of the other wire harness, depending on a combination (pattern) of the wire harnesses assigned to the divided regions, the electric wire of the one wire harness may have a connector; however, the electric wire of the other wire harness may not have a mating connector fitted to the connector. As such, a connector may not have a mating connector fitted thereto, depending on a combination (pattern) of the wire harnesses assigned to the divided regions, and in this description, this connector is defined as an "unmated connector".

When a wire harness with an unmated connector is routed in a vehicle panel, it is necessary to implement countermeasures of fixing the unmated connector to the vehicle panel, a main electric wire of the wire harness with the unmated connector or the like so as to prevent the movement of the unmated connector while a vehicle is travelling. An unmated connector makes an abnormal sound due to vibration while a vehicle having an unfixed unmated connector is travelling, and the unmated connector becomes the cause of a defect of the vehicle. When a wire harness is evaluated using an analysis apparatus, it is important to determine whether the wire harness, that is, an analysis target has an unmated connector in such a way that countermeasures of fixing the unmated connector are appropriately implemented while the wire harness is routed, and a defect originating from the unmated connector is prevented in advance.

The present invention is made in light of this problem, and an object of the present invention is to provide a method for determining an unmated connector by which it is possible to specify an unmated connector from connectors of a wire harness via analysis, and a program.

In order to achieve this object, a method for determining an unmated connector and a program according to the present invention have the following characteristics (1) to (4).

(1) A method for determining an unmated connector, the method including:

a formation step of forming one pattern by assigning a wire harness with an arbitrary part number out of wire harnesses routed in each of divided regions into which a space of a vehicle is divided;

an identification step of identifying for each pattern a group of electric wires of a first wire harness assigned to a first divided region of the divided regions as a necessary electric wire having a connection counterpart in a second divided region adjacent to the first divided region among the divided regions and an extra electric wire not having a connection counterpart in the second divided region; and a determination step of determining, out of connectors connected to a group of the electric wires of the first wire harness, that a connector is an unmated connector when all electric wires connected to the connector are the extra electric wires.

(2) The method for determining the unmated connector according to the configuration (1), the method further including:

a storage step of storing whether an arbitrary connector connected to the group of the electric wires of the first wire harness is an unmated connector, for each pattern; and an output step of identifiably outputting a pattern for which there is an unmated connector present.

(3) The method for determining the unmated connector according to the configuration (2), wherein the output step outputs an identifier for identifying the unmated connector.

(4) A program that causes a computer to execute each step in the method for determining the unmated connector according to any one of the configurations (1) to (3).

According to the method for determining an unmated connector described in the configuration (1), it is possible to specify an unmated connector from connectors of a wire harness via analysis.

According to the method for determining an unmated connector described in configuration (2), it is possible to output a display of the existence of an unmated connector in such a manner that an inspector more easily understands the existence of the unmated connector.

According to the method for determining an unmated connector described in configuration (3), it is possible to output a display of the existence of an unmated connector in such a manner that an inspector more easily understands the existence of the unmated connector.

According to the program described in configuration (4), it is possible to specify whether a wire harness has an unmated connector via analysis.

According to the method for determining an unmated connector and the program of the present invention, it is possible to specify whether a wire harness has an unmated connector via analysis.

The present invention has been briefly described above. When an aspect (hereinafter, referred to as an embodiment) of embodying the present invention (to be described) is read through with reference to the accompanying drawings, the details of the present invention will become more apparent.

BRIEF DESCRIPTION OF THE DRAWINGS

FIG. 2 is a diagram illustrating inspection histories after the continuity inspection phase is completed, in the method for determining an unmated connector according to the embodiment of the present invention.

FIG. 4 is a table illustrating an example of the recorded inspection histories after the continuity inspection phase for one pattern is completed.

FIG. 5 is a table illustrating the partial editing of the inspection histories illustrated in FIG. 4.

FIG. 6 is a table illustrating the partial rearrangement of the edited inspection histories illustrated in FIG. 5.

FIGS. 7A to 7C are tables illustrating an example of a display of results from an unmated connector output phase in the method for determining an unmated connector according to the embodiment of the present invention.

FIGS. 10A and 10B are diagrams illustrating unmated connectors, in which FIG. 10A illustrates a case in which there are mating connectors present which are respectively fitted into the unmated connectors, and FIG. 10B illustrates a case in which there are no mating connectors present which are respectively fitted thereinto.

DETAILED DESCRIPTION OF THE EXEMPLARY EMBODIMENTS

Hereinafter, a specific embodiment of the present invention will be described with reference to the accompanying drawings.

Figure 10A:
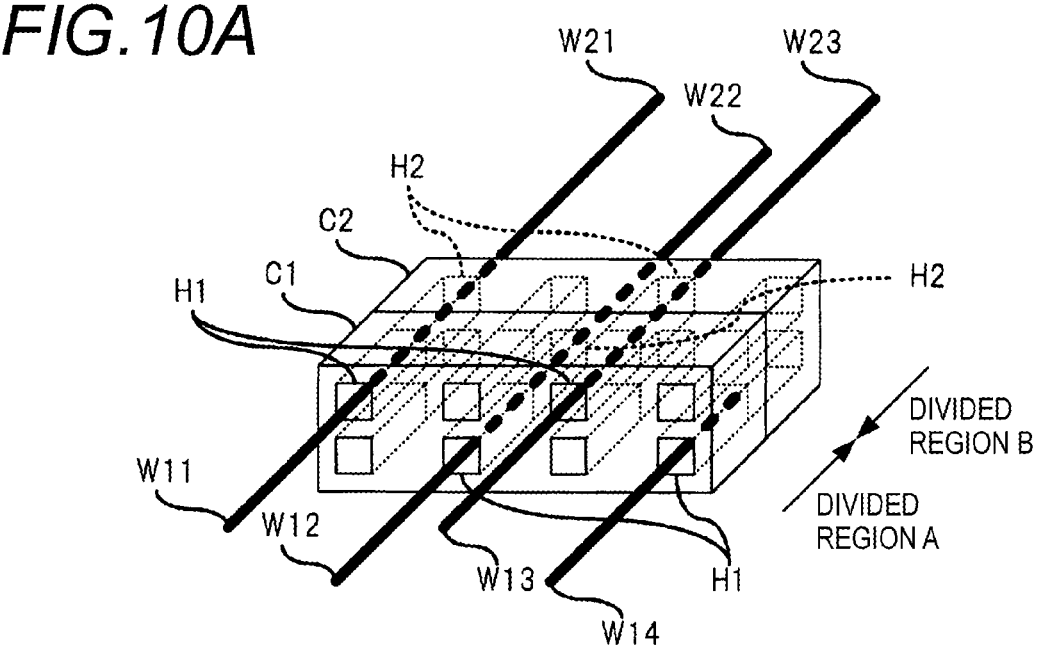
Figure 10B:
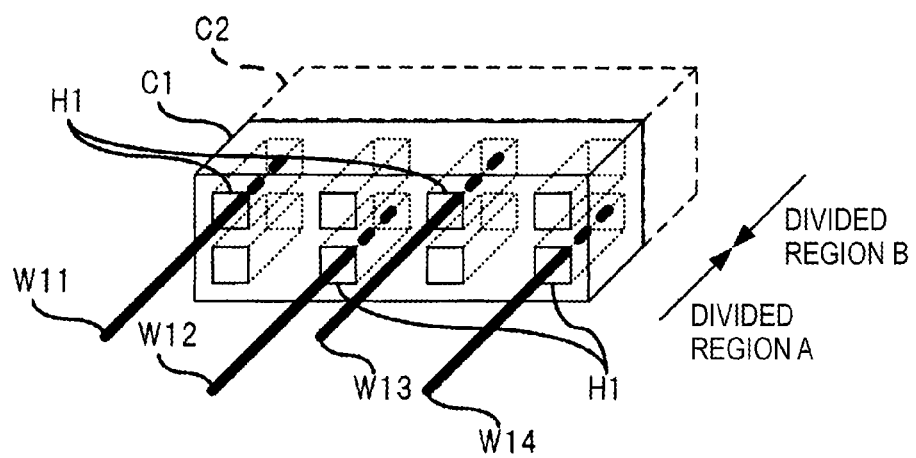

Before the embodiment of the present invention is described, an unmated connector will be described with reference to FIGS. 10A and 10B. FIGS. 10A and 10B are diagrams illustrating unmated connectors, FIG. 10A illustrates a case in which there are mating connectors present which are respectively fitted into the unmated connectors, and FIG. 10B illustrates a case in which there are no mating connectors present which are respectively fitted thereinto.

As illustrated in FIG. 10A, a connector C1 is provided in end portions of electric wires W11 to W14 of one wire harness routed in a divided region A, and a cavity H1 accommodates a terminal (not illustrated) positioned in the end portion of each of the electric wires W11 to W14. A connector C2 is provided in end portions of electric wires W21 to W23 of the other wire harness routed in a divided region B, and a cavity H2 accommodates a terminal (not illustrated) positioned in the end portion of each of the electric wires W21 to W23. When the connector C1 and the connector C2 are fitted into each other, a part or the entirety of the electric wires W11 to W14 accommodated in one connector C1 are electrically conducted to the electric wires W21 to W23 accommodated in the other connector C2 via the mating terminals, respectively. In the case illustrated in FIG. 10A, the electric wires W11 to W13 accommodated in the connector C1 of the one wire harness are electrically conducted to the electric wires W21 to W23 accommodated in the connector C2 of the other wire harness via the mating terminals, respectively.

In contrast, in FIG. 10B, assumably, the part number of one wire harness routed in the divided region A is the same as that of the wire harness routed in the divided region A illustrated in FIG. 10A, and the part number of the other wire harness routed in the divided region B is different from that of the wire harness routed in the divided region B illustrated in FIG. 10A. As illustrated in FIG. 10B, the other wire harness routed in the divided region B does not have the connector C2 that is fitted into the connector C1. For this reason, when the one wire harness is routed in the divided region A, and the other wire harness is routed in the divided region B, the connector C1 becomes an unmated connector.

Here, the inventors pay attention to the following two points in regard to specifying whether a wire harness has an unmated connector via analysis. That is, (1) As illustrated in FIG. 10A, the electric wires (the electric wires W11 to W13 of the one wire harness, and the electric wires W21 to W23 of the other wire harness) are electrically conducted to each other via the connector C1 that is not an unmated connector.

(2) As illustrated in FIG. 10B, the electric wires are not electrically conducted to each other via the connector C1 that is an unmated connector.

Hereinafter, an algorithm which determines whether a wire harness has an unmated connector based on these two observations will be described.

The method for determining an unmated connector according to the embodiment of the present invention will be described in detail. The method for determining an unmated connector according to the embodiment of the present invention can be divided into three phases. A first phase is a continuity inspection phase, a second phase is an unmated connector detection phase, and a third phase is an unmated connector output phase. Hereinafter, each phase will be described in detail.

[Conductivity Inspection Phase]

In the method for determining an unmated connector according to the embodiment of the present invention, the continuity inspection phase has a formation step of forming one pattern by assigning a wire harness with an arbitrary part number out of wire harnesses routed in each of divided regions into which the space of a vehicle is divided, and an identification step of identifying for each pattern a group of electric wires of a first wire harness assigned to a first divided region of the divided regions as a necessary electric wire having a connection counterpart in a second divided region adjacent to the first divided region among the divided regions, and an extra electric wire not having a connection counterpart in the second divided region. For example, the continuity inspection phase is equivalent to a wire harness continuity inspection method disclosed in JP-A-2011-137800 filed by the applicant of this application.

Refer to paragraphs [0043] to [0180] of the description of JP-A-2011-137800 for the formation step of the continuity inspection phase. Refer to paragraphs [0143] to [0170] of the description of JP-2011-137800 for the identification step of the continuity inspection phase.

Figure 1A:
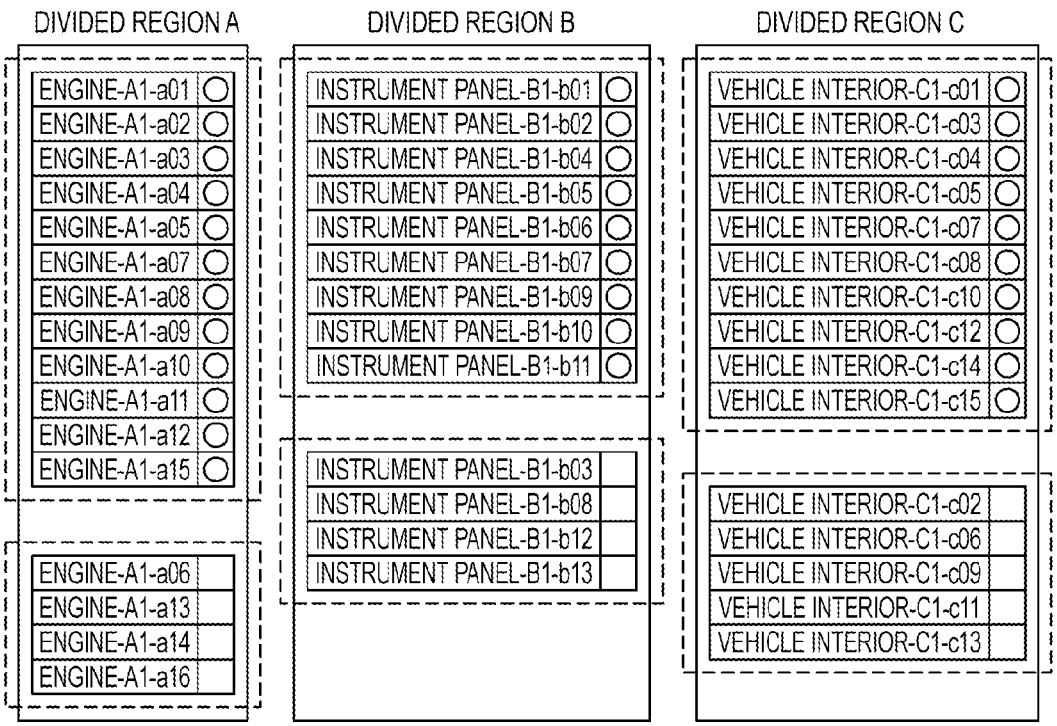
FIG. 1A shows tables illustrating recorded data after a continuity inspection phase for one pattern is completed, in a method for determining an unmated connector according to an embodiment of the present invention

When the identification step is completely executed for one partial connector and wiring pattern, an inspection history is recorded for each of the inspected electric wires of a wire harness. FIG. 1A shows tables illustrating recorded data after the continuity inspection phase for one pattern is completed, in the method for determining an unmated connector according to an embodiment of the present invention. In FIG. 1A, the space of a vehicle is assumably divided into three divided regions.

As illustrated in FIG. 1A, inspection histories are recorded for each of divided regions A, B, and C. An inspection history contains information regarding a continuity inspection target, and a continuity inspection result for the continuity inspection target. In FIG. 1A, for descriptive purposes, a continuity inspection target is denoted with "XXXX-YY-ZZZ", in which "XXXX" refers to an identifier for identifying a divided region, "YY" refers to an identifier for identifying the part number of a wire harness that can be routed in a divided region identified by "XXXX", and "ZZZ" refers to an identifier for identifying an electric wire installed in a divided region identified by "XXXX". In the example of the divided region A, since the divided region A is an engine compartment, a string of characters like "engine" are written in "XXXX", and since a wire harness with a part number "A1" is assigned to the divided region A, "A1" is written in "YY", and each of electric wire identifiers "a01" to "a16" is written in "ZZZ" as electric wire identification information. A continuity inspection target is uniquely selected by designating a divided region identifier, a wire harness part number identifier, and an electric wire identifier. Twenty-five types of electric wires "a01" to "a25" can be installed in the divided region A. For this reason, the wire harness with the part number "A1" assigned to the divided region "engine" includes the electric wires "a01" to "a16" among the electric wires "a01" to "a25".

In addition, a continuity inspection result for each continuity inspection target is recorded in association with the continuity inspection target. In FIG. 1A, for descriptive purposes, a continuity inspection result is indicated by two denotative signs "○" and "blank space". The sign "○" means that the continuity of an associated continuity inspection target is successfully inspected, and "blank space" means that a continuity inspection result is not recorded in association with a continuity inspection target, that is, the continuity of a continuity inspection target is not inspected. In FIG. 1A, the continuity inspection targets successfully inspected for continuity, and the continuity inspection targets not inspected for continuity are arranged sequentially from the top to the bottom. From the inspection histories in the divided region A, it is understood that in the wire harness with the part number "A1" assigned to the divided region "engine", twelve electric wires are successfully inspected for continuity and have the respective connection counterparts, and four electric wires do not have the respective recorded continuity inspection results and do not have the respective connection counterparts.

In the example of the divided region B, since the divided region B is an instrument panel, a string of characters like "instrument panel" are written in "XXXX", and since a wire harness with a part number "B1" is assigned to the divided region B, "B1" is written in "YY", and each of electric wire identifiers "b01" to "b13" is written in "ZZZ" as electric wire identification information. Twenty-five types of electric wires "b01" to "b25" can be installed in the divided region B. For this reason, the wire harness with the part number "B1" assigned to the divided region "instrument panel" includes the electric wires "b01" to "b13" among the electric wires "b01" to "b25". In FIG. 1A, also in the divided region B, the continuity inspection targets successfully inspected for continuity, and the continuity inspection targets not inspected for continuity are arranged sequentially from the top to the bottom. From the inspection histories in the divided region B, it is understood that in the wire harness with the part number "B1" assigned to the divided region "instrument panel", nine electric wires are successfully inspected for continuity and have the respective connection counterparts, and four electric wires do not have the respective recorded continuity inspection results and do not have the respective connection counterparts.

In the example of the divided region C, since the divided region C is a vehicle interior, a string of characters like "vehicle interior" are written in "XXXX", and since a wire harness with a part number "C1" is assigned to the divided region C, "C1" is written in "YY", and each of electric wire identifiers "c01" to "c15" is written in "ZZZ" as electric wire identification information. Twenty-five types of electric wires "c01" to "c25" can be installed in the divided region C. For this reason, the wire harness with the part number "C1" assigned to the divided region "vehicle interior" includes the electric wires "c01" to "c15" among the electric wires "c01" to "c25". In FIG. 1A, also in the divided region C, the continuity inspection targets successfully inspected for continuity, and the continuity inspection targets not inspected for continuity are arranged sequentially from the top to the bottom. From the inspection histories in the divided region C, it is understood that in the wire harness with the part number "C1" assigned to the divided region "vehicle interior", ten electric wires are successfully inspected for continuity and have the respective connection counterparts, and four electric wires do not have the respective recorded continuity inspection results and do not have the respective connection counterparts.

Figure 1B:
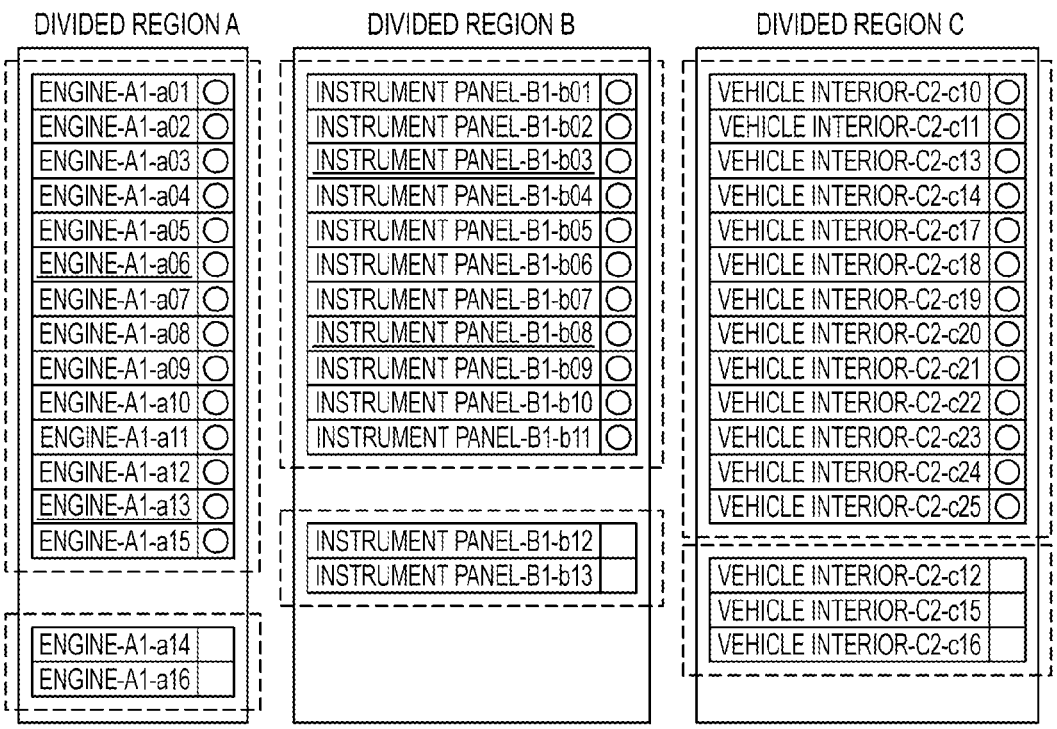
FIG. 1B shows tables illustrating recorded data after a continuity inspection phase for another pattern is completed, in the method for determining an unmated connector according to the embodiment of the present invention.

Hereinafter, the following description with reference to FIG. 1B is regarding recorded inspection histories when the identification step is completely executed for another partial connector and wiring pattern. FIG. 1B shows tables illustrating the recorded data after the continuity inspection phase for the other connector and wiring pattern is completed, in the method for determining an unmated connector according to the embodiment of the present invention. The inspection histories described with reference to FIG. 1A are for the partial connector and wiring pattern in which the wire harness with the part number "A1" is assigned to the divided region A, the wire harness with the part number "B1" is assigned to the divided region B, and the wire harness with the part number "C1" is assigned to the divided region B. FIG. 1B illustrates the inspection histories for the case in which the wire harness assigned to the divided region C has a different part number, and illustrates the inspection histories for a partial connector and wiring pattern in which the wire harness with the part number "A1" is assigned to the divided region A, the wire harness with the part number "B1" is assigned to the divided region B, and a wire harness with a part number "C2" is assigned to the divided region C.

The wire harness with the same part number "A1" as in the description of FIG. 1A is assigned to the divided region A. For this reason, the wire harness with the part number "A1" assigned to the divided region "engine" includes the electric wires "a01" to "a16". From the inspection histories in the divided region A, it is understood that in the wire harness with the part number "A1" assigned to the divided region "engine", fourteen electric wires are successfully inspected for continuity and have the respective connection counterparts, and two electric wires do not have the respective recorded continuity inspection results and do not have the respective connection counterparts.

The wire harness with the same part number "B1" as in the description of FIG. 1A is assigned to the divided region B. For this reason, the wire harness with the part number "B1" assigned to the divided region "instrument panel" includes the electric wires "b01" to "b13". From the inspection histories in the divided region B, it is understood that in the wire harness with the part number "B1" assigned to the divided region "instrument panel", eleven electric wires are successfully inspected for continuity and have the respective connection counterparts, and two electric wires do not have the respective recorded continuity inspection results and do not have the respective connection counterparts.

The part number "C2" of the wire harness assigned to the divided region C is different from that of the wire harness described in FIG. 1A. The wire harness with the part number "C2" assigned to the divided region "vehicle interior" includes the electric wires "c10" to "b25" among the electric wires "c01" to "c25". From the inspection histories in the divided region C, it is understood that in the wire harness with the part number "C2" assigned to the divided region "vehicle interior", thirteen electric wires are successfully inspected for continuity and have the respective connection counterparts, and three electric wires do not have the respective recorded continuity inspection results and do not have the respective connection counterparts.

As can be understood from a comparison between the respective inspection histories illustrated in FIGS. 1A and 1B, when the continuity of an electric wire is inspected for different partial connector and wiring patterns, the respective inspection histories for the partial connector and wiring patterns are different from each other even though a wire harness with the same part number is assigned to a divided region for the patterns. For example, as illustrated in FIG. 1A, according to the inspection histories after the continuity inspection phase for a connector and wiring pattern is completed, the continuity of twelve electric wires is successfully inspected in the divided region A. In contrast, as illustrated in FIG. 1B, according to the inspection histories after the continuity inspection phase for another connector and wiring pattern is completed, the continuity of fourteen electric wires is successfully inspected in the divided region A. Similarly, as illustrated in FIG. 1A, the continuity of nine electric wires is successfully inspected in the divided region B. In contrast, as illustrated in FIG. 1B, the continuity of eleven electric wires is successfully inspected in the divided region B. The reason for an increase (or a decrease) in the number of electric wires successfully inspected for continuity is because the number of specifications for the other connector and wiring pattern is greater than (or less than) that for the one connector and wiring pattern, and the number of electric wires (electric wires being connected to electric circuits for realizing the specifications) for the other connector and wiring pattern is greater than (or less than) that for the connector and wiring pattern.

As described above with reference to FIGS. 1A and 1B, a continuity inspection phase has a formation step of forming one pattern by assigning a wire harness with an arbitrary part number out of wire harnesses routed in each of divided regions into which the space of a vehicle is divided, and an identification step of identifying a necessary electric wire having a connection counterpart in a second divided region adjacent to a first divided region among the divided regions, and an extra electric wire not having a connection counterpart in the second divided region from a group of electric wires of a first wire harness assigned to the first divided region of the divided regions, for each pattern. Hereinafter, an electric wire having a successful continuity inspection result may be referred to as a necessary electric wire, and an electric wire not having a recorded continuity inspection result may be referred to as an extra electric wire. When necessary electric wires and extra electric wires are identified from a group of electric wires of a wire harness, as illustrated in FIG. 2, it is possible to generalize the inspection histories after the continuity inspection phase is completed. FIG. 2 is a diagram illustrating the inspection histories after the continuity inspection phase is completed, in the method for determining an unmated connector according to the embodiment of the present invention.

As illustrated in FIG. 2, after the continuity inspection phase is completed, the inspection histories of the continuity inspection for P (the total number of patterns) partial connector and wiring patterns are recorded. Here, a vehicle, that is, an inspection target in the continuity inspection phase, has N divided regions, and the divided regions are respectively denoted with $D(1), D(2), \ldots D(n), \ldots D(N)$ (here, N is a natural number). When the total number of part numbers of wire harnesses assigned to the divided region $D(n)$ is $W(n)$, P (the total number of partial connector and wiring patterns inspected for continuity in the continuity inspection phase) is calculated by expression $P=W(1) \times W(2) \times \ldots \times W(N)$. In addition, $p(x)$ is used so as to denote an x-th pattern among P (the total number of patterns) patterns (here, x is $1, 2, \ldots x, \ldots P$). In the inspection histories of a continuity inspection for the x-th partial connector and wiring pattern $p(x)$, a necessary electric wire and an extra electric wire of a wire harness assigned to the divided region $D(n)$ are respectively denoted with M and R. As illustrated in FIG. 2, for each of patterns $p(1), p(2), \ldots, p(P)$, the necessary electric wires M and the extra electric wires R in an arbitrary divided region $D(n)$ are recorded in the inspection history after the continuity inspection phase is completed. Data illustrated in FIGS. 1A and 1B is equivalent to the inspection histories of continuity inspection for a pattern $p(x)$ illustrated in FIG. 2.

The continuity inspection phase of the method for determining an unmated connector according to the embodiment of the present invention is one embodiment of the wire harness continuity inspection method disclosed in JP-A-2011-137800; however, the present invention is not limited to that embodiment. The following technique can be applied to the present invention: the technique of being able to identify a necessary electric wire having a connection counterpart in a second divided region adjacent to a first divided region among the divided regions, and an extra electric wire not having a connection counterpart in the second divided region from a group of electric wires of a first wire harness assigned to the first divided region of the divided regions, for each pattern.

[Unmated Connector Detection Phase]

Figure 3:
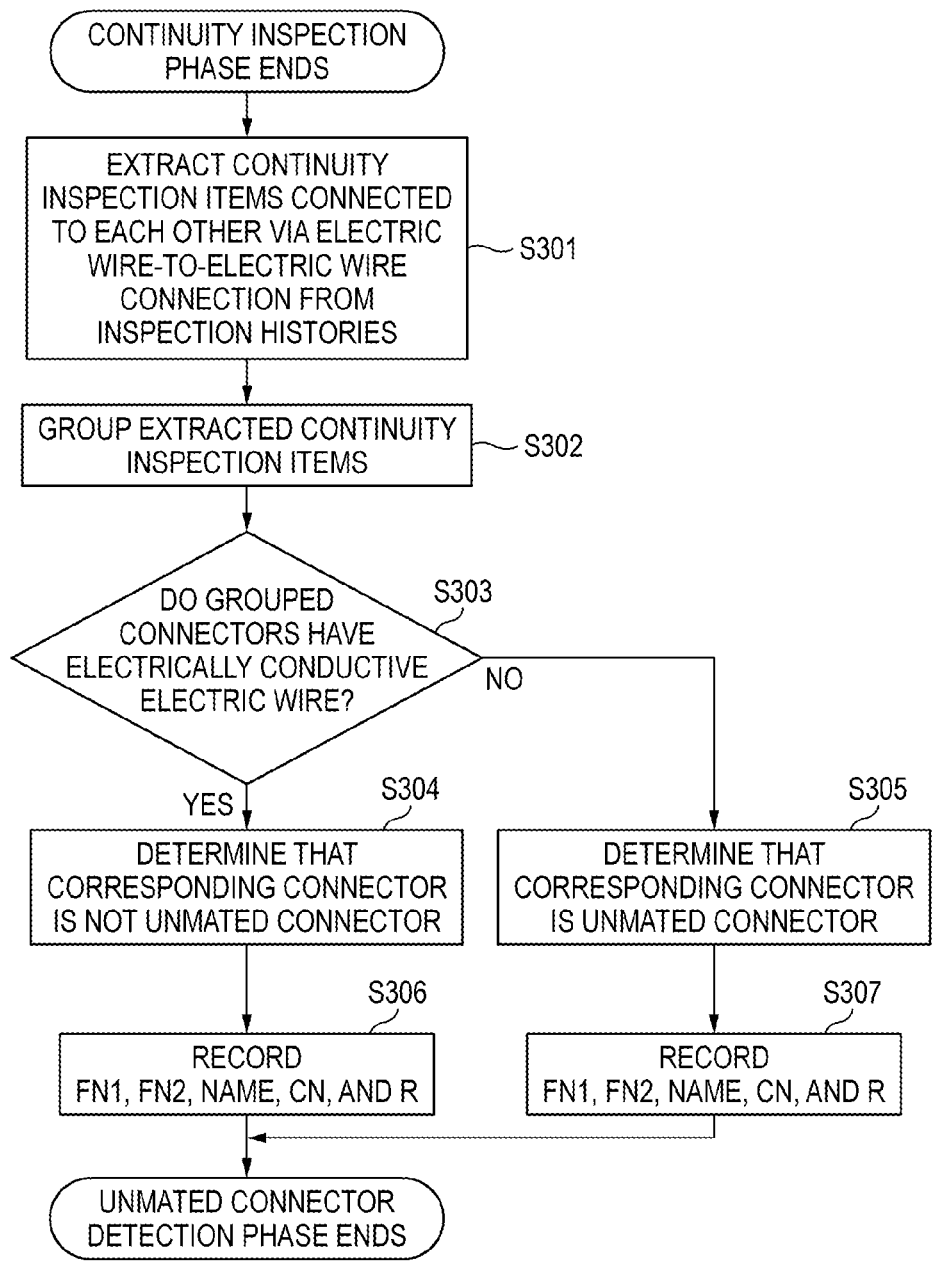
FIG. 3 is a flowchart illustrating an unmated connector detection phase in the method for determining an unmated connector according to the embodiment of the present invention.

The description given up to now with reference to FIGS. 1A and 1B is regarding the recorded inspection histories when the identification step is completely executed for a partial connector and wiring pattern. As described above, when the identification step is completely executed, a wire harness with a predetermined part number assigned to each of the divided regions A, B, and C may have extra electric wires. The extra electric wires may contain an electrical connector connected to an unmated connector. Hereinafter, the unmated connector detection phase will be described with reference to FIGS. 3 to 6, in which an electric wire connected to an unmated connector is specified among extra electric wires. FIG. 3 is a flowchart illustrating the unmated connector detection phase in the method for determining an unmated connector according to the embodiment of the present invention. FIG. 4 is a table illustrating an example of the recorded inspection histories after the continuity inspection phase for one pattern is completed. FIG. 5 is a table illustrating the partial editing of the inspection histories illustrated in FIG. 4. FIG. 6 is a table illustrating the partial rearrangement of the edited inspection histories illustrated in FIG. 5.

In the section [Continuity Inspection Phase], referring to FIGS. 1A and 1B, a continuity inspection target is denoted with "XXXX-YY-ZZZ" in a recorded inspection history after the continuity inspection phase for one pattern is completed. In particular, "ZZZ" indicates an identifier for identifying an electric wire, and as disclosed in JP-A-2011-137800, this identifier may further include identifier specifying items. Before the unmated connector detection phase is described, first, recorded inspection histories after the continuity inspection phase is completed for one pattern will be described in detail with reference to FIG. 4.

As illustrated in FIG. 4, a continuity inspection target in an inspection history includes the following three elements: (1) drawing number; (2) F connector name, connector part number, terminal, and cavity number (hereinafter, simply referred to as C/N); and (3) T connector name, connector part number, terminal, and C/N. Four columns from the F connector name to the C/N is one set, and similarly, four columns from the T connector name to the C/N is one set. A row of elements indicative of a continuity inspection target in an inspection history indicates one electric wire in the partial connector and wiring information. When "XXXX-YY-ZZZ" denoting a continuity inspection target illustrated in FIGS. 1A and 1B are associated with the elements (1) to (3) denoting a continuity inspection target illustrated in FIG. 4, "XXXX-YY" corresponds to a drawing number in the element (1), and "ZZZ" corresponds to the elements (2) and (3). In FIG. 4, one electric wire is specified by information (F connector name and connector part number) for identifying a connector connected to one end of the electric wire, information (terminal and C/N) for identifying a terminal, information (T connector name and connector part number) for identifying a connector connected to the other end of the electric wire, and information (terminal and C/N) for identifying a terminal. In FIG. 4, a continuity inspection result is recorded in association with a continuity inspection target specified by the elements (1) to (3).

Hereinafter, the processes of the unmated connector detection phase will be described with reference to the recorded inspection histories after the continuity inspection phase is completed for one pattern, which are illustrated in FIG. 4. In the continuity inspection phase, the inspection histories are recorded for the partial connector and wiring information according to which a wire harness with the part number "A1" is assigned to the divided region "engine" and a wire harness with the part number "B1" is assigned to the divided region "instrument panel", and an example of applying the unmated connector detection phase to the wire harness routed in the divided region "engine" will be described. Similarly, the unmated connector detection phase can be applied to the respective wire harnesses routed in divided regions other than the divided region "engine".

First, from the continuity inspection targets in the inspection histories for the divided region "engine", a continuity inspection target is extracted, which is connected to an electric wire installed in a divided region adjacent to the divided region "engine" via the respective connectors (step S301). When a connector at one end of an electric wire installed in the divided region A is connected to an object positioned in the divided region B adjacent to the divided region A, the object positioned in the divided region B is assumably an electric wire, a junction box (JB), a joint connector (JC), or the like. In this example, an object positioned in the divided region B is limited to an electric wire, which causes the wire harness routed in the divided region A to have an unmated connector. For this reason, in step S301, the connection via the respective connectors between the continuity inspection target in the inspection histories for the divided region "engine", and an electric wire installed in the divided region "instrument panel" adjacent to the divided region "engine" is narrowed down to electric wire-to-electric wire connection.

In regard to narrowing the inspection histories for the divided region "engine" down to the continuity inspection targets having electric wire-to-electric wire connection in step S301, an information look-up table regarding connectors used for the electric wire-to-electric wire connection is prepared as a fitting library, and a continuity inspection target (continuity inspection target having a T connector name and a connector part number listed in the fitting library) in the inspection histories for the divided region "engine" is extracted as an electric wire having electric wire-to-electric wire connection. FIG. 5 illustrates the inspection histories containing the partial extracted inspection targets. As illustrated in FIG. 5, the inspection histories contain the partial extracted inspection targets having a T connector name denoted with "W to W 2".

The case in which a T connector name or a connector part number corresponding to the T connector name is compared to the fitting library is described. The reason for this is because the connection between an electric wire installed in the divided region "engine", and an object in the divided region "instrument panel" adjacent to a T connector of the electric wire is narrowed down to electric wire-to-electric wire connection. When the connection between an electric wire installed in a divided region, and an object in another divided region adjacent to an F connector of the electric wire is narrowed down to electric wire-to-electric wire connection, an F connector name and a connector part number corresponding to the F connector name can be compared to the fitting library.

Subsequently, in step S301, the partial extracted inspection targets in the inspection histories are grouped based on the T connector names and the connector part numbers (step S302). FIG. 6 illustrates the inspection histories grouped in this manner. As illustrated in FIG. 6, the connectors are grouped into the following two connector groups: a connector (connector 1) group in which the T connector name is "W to W 2" and the connector part number is "XXX", and a connector (connector 2) group in which the T connector number is "W to W 2" and the connector part number is "YYY".

Subsequently, it is determined whether each of the grouped connectors has an electrically conductive electric wire in regard to the inspection histories grouped in step S302 (step S303). When a connector has an electrically conductive electric wire (YES in step S303), the connector is not determined to be an unmated connector (step S304). In contrast, when a connector has no electrically conductive electric wires (NO in step S303), the connector is determined to be an unmated connector (step S305). Since the connector 1 between the two connector groups illustrated in FIG. 6 has an electrically conductive electric wire, the connector 1 is not determined to be an unmated connector. In contrast, since the connector 2 has no electrically conductive electric wires, the connector 2 is determined to be an unmated connector.

After it is determined whether there is an unmated connector present in step S304 or S305 of the unmated connector detection phase, subsequently, the following data is recorded for each of the connectors, for which it is determined whether to have an unmated connector (step S306 or S307): drawing number FN1 of a wire harness assigned to one divided region and drawing number FN2 of the other wire harness assigned to the other divided region out of wire harnesses connected to each other via electric wire-to-electric wire connection between two divided regions, and T connector name NAME, connector part number CN, and unmated connector determination R for a connector which is a target of determination of whether to have an unmated connector. For example, in the two connector groups illustrated in FIG. 6, (A1, B1, W to W 2, XXX, and OK) are respectively recorded for (FN1, FN2, NAME, CN, and R) of the connector 1. In addition, (A1, B1, W to W 2, YYY, and NG) are respectively recorded for (FN1, FN2, NAME, CN, and R) of the remaining connector 2. The reason for writing (FN1, FN2, NAME, CN, and R) information for each of the connectors in step S306 or S307, for which it is determined whether to have an unmated connector, will be described in the next section [Unmated Connector Output Phase].

In the unmated connector detection phase of the method for determining an unmated connector according to the embodiment of the present invention, as described above, it is determined whether a wire harness assigned in an arbitrary divided region for a pattern has an unmated connector, with reference to inspection histories for the partial connector and wiring pattern. The unmated connector detection phase is executed for each of the inspection histories for the entirety of the partial connector and wiring patterns output from the continuity inspection phase. As a result, according to the method for determining an unmated connector of the embodiment of the present invention, it is possible to specify an unmated connector from connectors of a wire harness via analysis. Accordingly, since it is possible to determine whether there is an unmated connector present, it is possible to prevent an unmated connector from being overlooked while countermeasures of fixing the unmated connector to a vehicle panel, a main electric wire of a wire harness, or the like are not implemented. As a result, it is possible to prevent an occurrence of defect originating from an unfixed unmated connector.

[Unmated Connector Output Phase]

Up to now, the method for determining an unmated connector is described. Hereinafter, a method for outputting a display of a connector in such a manner for an inspector to more easily to understand will be described, for which it is determined whether to have an unmated connector.

In a case where two wire harnesses with different part numbers can be routed in the divided region A, a wire harnesses can be routed in the divided region B adjacent to the divided region A, and the two wire harnesses routable in the divided region A have the same connector, the connector of a wire harness with a part number routed in the divided region A may be determined to be an unmated connector, and the connector of the other wire harness with the other part number routed in the divided region A may not be determined to be an unmated connector. For this reason, insofar as the part number of each of wire harnesses routed in two adjacent divided regions is not specified, it is not possible to unmistakably specify whether a predetermined connector of a wire harness with a part number is an unmated connector.

According to a technique that the inventors consider effective, the respective part numbers of wire harnesses routable in the divided region A and the respective part numbers of wire harnesses routable in the divided region B adjacent to the divided region A are displayed in a matrix form, and a sign indicative of the existence and non-existence of an unmated connector is displayed in a cell in which the part numbers intersect each other. Hereinafter, a method for displaying signs indicative of the existence and non-existence of an unmated connector in a matrix form will be described with reference to FIGS. 7A to 7C. FIGS. 7A to 7C are tables illustrating an example of a display of the results from an unmated connector output phase in the method for determining an unmated connector according to the embodiment of the present invention.

In the example of a display illustrated in FIG. 7A, the respective part numbers "A1" to "A10" of wire harnesses routed in the divided region "engine" are vertically listed, and the respective part numbers "B1" to "B10" of wire harnesses routed in the divided region "instrument panel" are horizontally listed. The existence and non-existence of a wire harness routed in the divided region "engine" or the divided region "instrument panel" is designated by "-" or "●" in each cell specified by an arbitrary part number of the part numbers "A1" to "A10" and an arbitrary part number of the part numbers "B1" to "B10", for a pattern in which the part numbers are assigned to the divided region. The sign "-" indicates that a wire harness has no an unmated connector, and the sign "●" indicates that a wire harness has an unmated connector. FIG. 7A illustrates an example in which each of the combinations (A3, B3), (A8, B3), (A5, B7), and (A7, B8) of the part numbers assigned to the divided region "engine" and the divided region "instrument panel" have an unmated connector.

As described above in the section [Unmated Connector Detection Phase], the (FN1, FN2, NAME, CN, and R) information is written for each of the connectors, for which it is determined whether to have an unmated connector, in such a manner that the existence and non-existence of an unmated connector is displayed in a matrix form using "-" or "●" (step S306 or S307 in FIG. 3). In the unmated connector detection phase, it is determined whether a wire harness assigned to an arbitrary divided region has an unmated connector for each pattern of the entirety of the partial connector and wiring patterns output from the continuity inspection phase. For this reason, when specifying the pattern of a part number of a wire harness that is assigned to each of two divided regions connected to each other via electric wire-to-electric wire connection, that is, when specifying a wire harness drawing number FN1 and a wire harness drawing number FN2, it is possible to retrieve (NAME, CN, R) information corresponding to the conditions of the drawing numbers FN1 and FN2 as look-ups for connectors. Here, when a single unmated connector determination result R is denoted with "NG" in the retrieved look-ups for connectors, "●" is displayed in a cell specified by the wire harness drawing number FN1 and the wire harness drawing number FN2. In contrast, when each of the entirety of unmated connector determination results R is denoted with "OK", "-" is displayed in each cell specified by the wire harness drawing number FN1 and the wire harness drawing number FN2. It is possible to realize the display in a matrix form illustrated in FIG. 7A by executing this process for the entirety of the combinations of the wire harness drawing number FN1 and the wire harness drawing number FN2.

In the unmated connector output phase, as described above, patterns having the respective unmated connector are identifiably output, and thereby it is possible to output the display of the existence and non-existence of an unmated connector in such a manner for an inspector to easily to understand.

In the example described with reference to FIG. 7A, the patterns with the part numbers having unmated connectors are identifiably output. With regard to a display form, more preferably, it is possible to output information for specifying a connector determined to be an unmated connector after a pattern having an unmated connector is recognized. A method for display information for specifying a connector determined to be an unmated connector will be described with reference to FIG. 7B.

In regard to specifying a connector determined to be an unmated connector, first, a pattern is selected, which have an unmated connector. In FIG. 7B, a cell is selected, which is specified by a combination (A8, B3) of the part numbers of wire harnesses assigned to the divided region "engine" and the divided region "instrument panel". At this time, (NAME, CN) information regarding a connector is retrieved, which corresponds to the conditions of the drawing numbers FN1 (A8) and FN2 (B3), and the determination result R (NG). The retrieved (NAME, CN) information is output in association with the corresponding cell. In the example illustrated in FIG. 7B, in a pop-up balloon branched off from the cell specified by the combination (A8, B3) of the part numbers of the wire harnesses, T connector names NAME1 and NAME2 and connector part numbers CN1 and CN2 of two connectors are displayed, which correspond to the condition of the determination result R (NG). It is possible to output a pattern having an unmated connector, and to output information for specifying a connector determined to be an unmated connector. As a result, it is possible to output a display of the existence and non-existence of an unmated connector in such a manner for an inspector to more easily understand.

In FIG. 7B, the mode of selecting a cell determined to have an unmated connector is described. However, an inspector does not necessarily select a cell. It is possible to output the (NAME, CN) information in association with a cell that is determined to be an unmated connector. For example, when a pop-up balloon is displayed while being branched off from each cell determined to have an unmated connector, and a T connector name NAME and a connector part number CN of a connector corresponding to the pop-up balloon, it is possible to determine an unmated connector without the selection of each cell, and to further improve work efficiencies.

As described above, in the process of step S306 or S307 illustrated in FIG. 3, the (FN1, FN2, NAME, CN, and R) information is recorded for each connector. In the description above, the part numbers FN1 and FN2 of two types of wire harnesses (wire harnesses being connected to each other via electric wire-to-electric wire connection between two divided regions connected to each other via electric wire-to-electric wire connection) are recorded; however, it is possible to record the respective part numbers of wire harnesses assigned to divided regions other than the two divided regions connected to each other via electric wire-to-electric wire connection. That is, in the process of step S306 or S307 illustrated in FIG. 3, (FN1, FN2, . . . , FNn, NAME, CN, and R) (here, n is a numeral greater than or equal to two) information is recorded for each connector.

For example, in FIG. 7A, assumably, the respective part numbers of wire harnesses assigned to three divided regions "engine", "instrument panel", and "vehicle interior" of the space of a vehicle are displayed in a matrix form. In FIG. 7A, a display of an unmated connector present in the cell (the cell being specified by the combination (A8, B3) of the respective part numbers of wire harnesses assigned to the divided region "engine" and the divided region "instrument panel") is output. However, when the wire harnesses routed in the divided region "vehicle interior" have the part numbers "C1" to "C10", respectively, this example is not limited to the case in which there is an unmated connector present for each of the entirety of the combinations (A8, B3, C1), (A8, B3, C2), . . . (A8, B3, C10) of wire harnesses assigned to the divided region "engine", the divided region "instrument panel", and the divided region "vehicle interior".

For this reason, in the process of step S306 or S307 illustrated in FIG. 3, (FN1, FN2, . . . , FNn, NAME, CN, and R) (here, n is a numeral greater than or equal to two) information is recorded for each connector, and thereby it is possible to output a display as follows. That is, as illustrated in FIG. 7B, a cell is selected, which is specified by the combination (A8, B3) of the part numbers of the wire harnesses assigned to the divided region "engine" and the divided region "instrument panel". At this time, (NAME, CN) information regarding a connector is retrieved, which corresponds to the conditions of the drawing numbers FN1 (A8), FN2 (B3), and FN3 (C1 to C10), and the determination result R (NG). The retrieved (NAME, CN) information is output in association with the corresponding cell. In addition, FN3 corresponding to the condition of the determination result R (NG) among FN3's is output in association with the corresponding cell. In the example illustrated in FIG. 7B, in a pop-up balloon branched off from the cell specified by the combination (A8, B3) of the part numbers of the wire harnesses, the part numbers "C3", "C6", "C8", and "C10" of the wire harnesses routed in the divided region "vehicle interior" are displayed, which correspond to the condition of the determination result R (NG). As such, the patterns having the respective unmated connectors are more strictly output, and thereby it is possible to output a display of the existence of an unmated connector in such a manner for an inspector to more easily to understand.

In addition, when a vehicle having four or more divided regions is a target, in the example of the display described with reference to FIG. 7B, it is not possible to display the part numbers of wire harnesses assigned to divided regions D, E, . . . subsequent to the fourth divided region. For this reason, in the process of step S306 or S307 illustrated in FIG. 3, (FN1, FN2, p(x), NAME, CN, and R) information is recorded for each connector. p(x) is information for identifying a combination of the part numbers of the wire harnesses assigned to the divided regions (refer to FIG. 2), p(x) assigned to an inspection history (inspection history becoming a target of determination of whether to have an unmated connector) is referred to, and is recorded in the process of step S306 or S307 illustrated in FIG. 3. Information in various forms is recorded in this manner, and thereby it is possible to output a display as follows. As illustrated in FIG. 7C, the cell is selected, which is specified by the combination (A8, B3) of the part numbers of the wire harnesses assigned to the divided region "engine" and the divided region "instrument panel". At this time, (NAME, CN) information regarding a connector is retrieved, which corresponds to the conditions of the drawing numbers FN1 (A8), FN2 (B3), and the determination result R (NG). The retrieved (NAME, CN) information is output in association with the corresponding cell. In addition, p(x) corresponding to the condition of the determination result R (NG) among p(x)'s is output in association with the corresponding cell. In the example illustrated in FIG. 7C, in a pop-up balloon branched off from the cell specified by the combination (A8, B3) of the part numbers of the wire harnesses, the patterns "p(1)", "p(5)", "p(7)", and "p(8)" are displayed, which correspond to the condition of the determination result R (NG). As such, the identification information regarding patterns having the respective unmated connectors are output, and thereby it is possible to output a display of the existence of an unmated connector in such a manner for an inspector to more easily to understand.

[Configuration of Wire Harness Continuity Inspection Apparatus]

Figure 8:
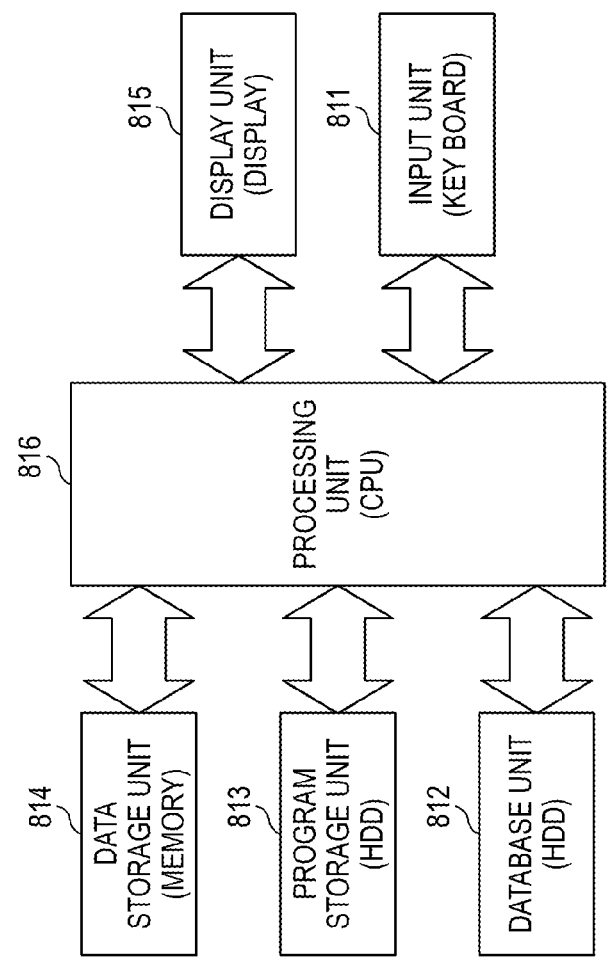
FIG. 8 is a block diagram of an apparatus that executes the method for determining an unmated connector according to the embodiment of the present invention.
Figure 9A:
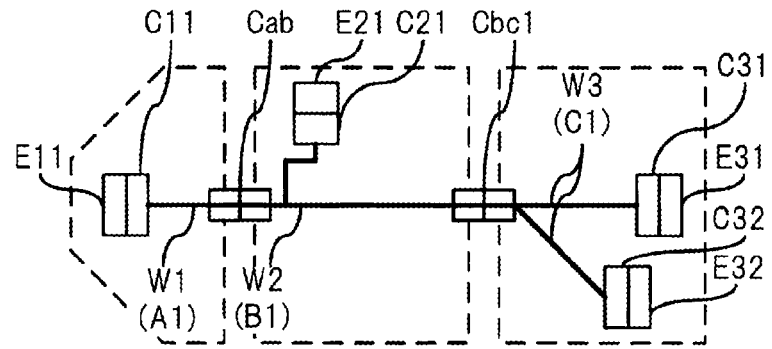
FIGS. 9A to 9C are diagrams illustrating when wire harnesses with different part numbers are respectively routed in the same type of vehicles.
Figure 9B:
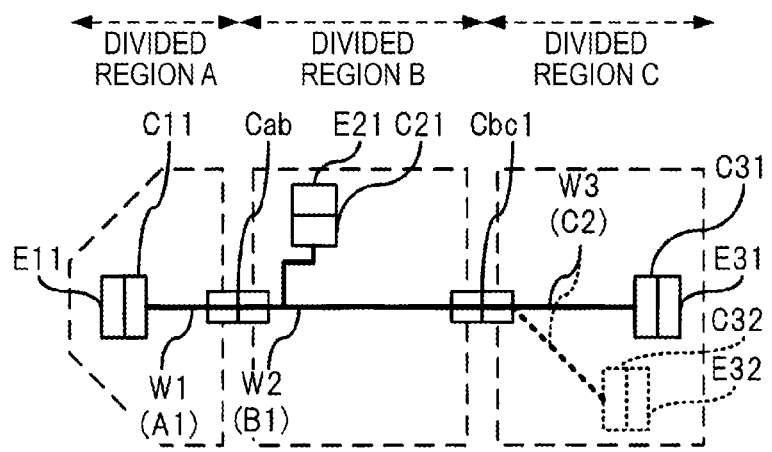
Figure 9C:
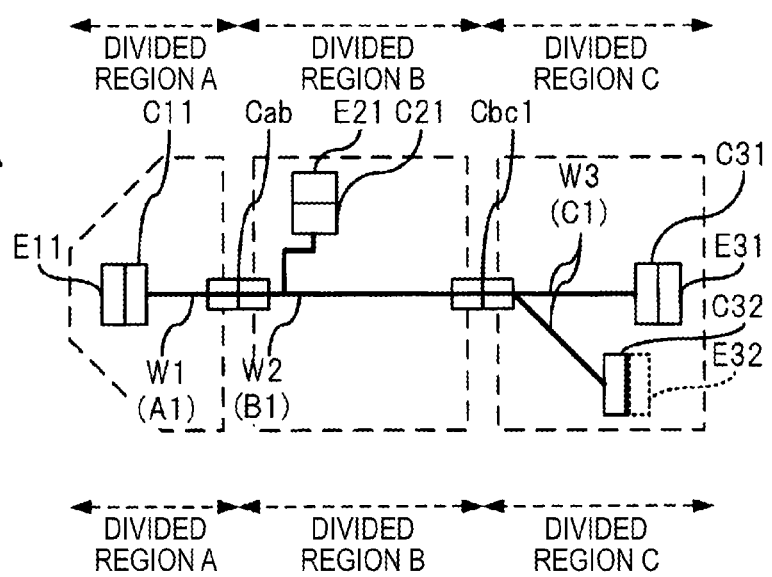

The following description with reference to FIG. 8 is regarding a wire harness continuity inspection apparatus that executes the method for determining an unmated connector according to the embodiment of the present invention. FIG. 8 is a functional block diagram of the apparatus that executes the method for determining an unmated connector according to the embodiment of the present invention.

The wire harness continuity inspection apparatus according to the embodiment of the present invention includes an input unit 811; a database unit 812; a program storage unit 813; a data storage unit 814; a display unit 815; and a processing unit 816. For example, when the wire harness continuity inspection apparatus of the present invention is configured by a general-purpose PC, the input unit 811 is realized by various input interfaces such as a keyboard, a mouse, and a ten key pad, the database unit 812 and the program storage unit 813 are realized by a hard disc drive (HDD), the data storage unit 814 is realized by a random access memory (RAM), the display unit 815 is realized by various output devices such as a CRT display or a liquid crystal display, and the processing unit 816 is realized by a central processing unit (CPU). The database unit 812 stores auxiliary device wiring data and partial connector and wiring data (as necessary, data for an actual wiring diagram prepared based on the auxiliary device wiring information), and data for auxiliary device specifications. The program storage unit 813 stores a program that causes the processing unit 816 to execute the [Continuity Inspection Phase], the [Unmated Connector Detection Phase], and the [Unmated Connector Output Phase]. The data storage unit 814 stores data input and output from the processing unit 816 that execute the [Continuity Inspection Phase], the [Unmated Connector Detection Phase], and the [Unmated Connector Output Phase].

Here, the characteristics of the method for determining an unmated connector and the program according to the embodiment of the present invention will be briefly summarized in the following configurations [1] to [4].

[1] A method for determining an unmated connector, the method including:

a formation step of forming one pattern by assigning a wire harness with an arbitrary part number out of wire harnesses routed in each of divided regions into which a space of a vehicle is divided;

an identification step of identifying for each pattern a group of electric wires of a first wire harness assigned to a first divided region of the divided regions as a necessary electric wire having a connection counterpart in a second divided region adjacent to the first divided region among the divided regions and an extra electric wire not having a connection counterpart in the second divided region; and a determination step of determining, out of connectors connected to a group of the electric wires of the first wire harness, that a connector is an unmated connector when all electric wires connected to the connector are the extra electric wires.

[2] The method for determining the unmated connector according to the configuration [1], the method further including:

a storage step of storing whether an arbitrary connector connected to the group of the electric wires of the first wire harness is an unmated connector, for each pattern; and an output step of identifiably outputting a pattern for which there is an unmated connector present.

[3] The method for determining the unmated connector according to the configuration [2], wherein the output step outputs an identifier for identifying the unmated connector.

[4] A program that causes a computer to execute each step in the method for determining the unmated connector according to any one of the configurations [1] to [3].

The present invention has been described in detail and with reference to the specific embodiment; however, it is apparent to persons skilled in the art that modifications and corrections can be made to the present invention in various forms insofar as the modifications and the corrections do not depart from the philosophy and the scope of the present invention.

According to the method for determining an unmated connector and the program of the present invention, it is possible to specify an unmated connector from connectors of a wire harness via analysis. The present invention having these effects is effective in determining whether a wire harness has an unmated connector without a fitting counterpart when the wire harness is routed in a vehicle panel.

What is claimed is:

1. A method for determining an unmated connector out of a plurality of connectors connected to electric wires of a wire harness, the method comprising:

a formation step of forming at least one pattern by assigning each of a plurality of wire harnesses with an arbitrary part number that indicates through which of divided regions into which a space of a vehicle is divided each of the wire harnesses is to be routed;

the formation step of forming at least one pattern includes assigning one of the wire harnesses to a first divided region;

an identification step of identifying each electric wire of each of the wire harnesses as one of a necessary electric wire and an extra electric wire for each pattern such that the one of the wire harnesses includes necessary electric wires and extra electric wires, where the necessary electric wires have a connection counterpart in a second divided region adjacent to the first divided region among the divided regions and the extra electric wires do not have a connection counterpart in the second divided region; and a determination step of determining, out of the connectors connected to the electric wires of the first wire harness, that a connector is an unmated connector when all electric wires connected to the connector are identified as extra electric wires.

2. A method for determining an unmated connector out of a plurality of connectors connected to electric wires of a wire harness, the method comprising:

a formation step of forming at least one pattern by assigning each of a plurality of wire harnesses with an arbitrary part number that indicates through which of divided regions into which a space of a vehicle is divided each of the wire harnesses is to be routed;

the formation step of forming at least one pattern includes assigning one of the wire harnesses to a first divided region;

an identification step of identifying each electric wire of each of the wire harnesses as one of a necessary electric wire and an extra electric wire for each pattern such that the one of the wire harnesses includes necessary electric wires and extra electric wires, where the necessary electric wires have a connection counterpart in a second divided region adjacent to the first divided region among the divided regions and the extra electric wires do not have a connection counterpart in the second divided region;

a determination step of determining, out of connectors connected to the electric wires of the first wire harness, that a connector is an unmated connector when all electric wires connected to the connector are identified as extra electric wires;

a storage step of storing whether an arbitrary connector connected to the group of the electric wires of the first wire harness is an unmated connector, for each pattern; and an output step of identifiably outputting a pattern for which there is an unmated connector present.

3. The method for determining the unmated connector according to claim 2, wherein the output step outputs an identifier for identifying the unmated connector.

4. A computer-readable storage medium in which is stored a program that causes a computer to execute each step in the method for determining the unmated connector according to claim 1.

5. A method for determining an unmated connector for each of a plurality of wire harnesses, each wire harness including a plurality of electric wires arranged into a plurality of groups, each of the wire harnesses further including a plurality of connectors, each of the connectors being connected to a respective one of the groups, each of the wire harnesses being configured to be routed through a respective one of a plurality of divided regions into which a space of a vehicle is divided, each of the connectors being configured to connect each electric wire of the respective one of the groups to a connection counterpart in an adjacent one of the divided regions, the method comprising:

forming at least one pattern by assigning each of a plurality of wire harnesses with an arbitrary part number that includes data indicating the respective one of the plurality of divided regions;

identifying, for each pattern, each of the electric wires as a necessary electric wire or an extra electric wire such that each electric wire of at least one of the groups of at least one of the wire harnesses is identified as an extra electric wire, where the necessary electric wire has the connection counterpart in the adjacent one of the divided regions, and where the extra electric wire does not have the connection counterpart in the adjacent one of the divided regions; and determining that the connector of the at least one of the groups is an unmated connector.

6. The method for determining the unmated connector according to claim 5, the method further comprising:

storing an identifier for identifying the unmated connector, for each pattern; and identifiably outputting each pattern for which there is an unmated connector present.

7. The method for determining the unmated connector according to claim 6, wherein the output step outputs the identifier for identifying the unmated connector.

8. A computer-readable storage medium in which is stored a program that causes a computer to execute each step in the method for determining the unmated connector according to claim 5.

* * * * *